United States Patent
Wu et al.

(10) Patent No.: US 10,788,051 B2
(45) Date of Patent: Sep. 29, 2020

(54) ELECTRIC WATER PUMP

(71) Applicant: Zhejiang Dongxin iTechnology Co., Ltd., Zhuji (CN)

(72) Inventors: Guoyao Wu, Zhuji (CN); Xiaoke Zhou, Zhuji (CN); Xinjiang Zhou, Zhuji (CN); Fengping Zhou, Zhuji (CN); Dong Chen, Zhuji (CN)

(73) Assignee: Zhejiang Dongxin iTechnology Co., Ltd., Zhuji (CN)

( * ) Notice: Subject to any disclaimer, the term of this patent is extended or adjusted under 35 U.S.C. 154(b) by 68 days.

(21) Appl. No.: 16/233,123

(22) Filed: Dec. 27, 2018

(65) Prior Publication Data

US 2020/0124056 A1   Apr. 23, 2020

(30) Foreign Application Priority Data

Oct. 22, 2018   (CN) .......................... 2018 1 1229247

(51) Int. Cl.
| | |
|---|---|
| *F04D 29/58* | (2006.01) |
| *F04D 13/06* | (2006.01) |
| *H02K 5/20* | (2006.01) |
| *H02K 5/04* | (2006.01) |
| *H02K 11/33* | (2016.01) |
| *H02K 5/22* | (2006.01) |
| *H02K 9/14* | (2006.01) |

(Continued)

(52) U.S. Cl.
CPC ......... *F04D 29/5806* (2013.01); *F04D 13/06* (2013.01); *F04D 25/082* (2013.01); *F04D 29/426* (2013.01); *F04D 29/588* (2013.01); *F04D 29/5813* (2013.01); *F04D 29/628* (2013.01); *H02K 5/04* (2013.01); *H02K 5/18* (2013.01); *H02K 5/20* (2013.01); *H02K 5/225* (2013.01); *H02K 9/14* (2013.01); *H02K 11/33* (2016.01); *H02K 5/165* (2013.01);
(Continued)

(58) Field of Classification Search
CPC . H02K 9/14; H02K 11/33; H02K 5/04; H02K 5/18; H02K 5/20; H02K 5/225; F04D 29/263; F04D 29/426; F04D 29/588; F04D 29/628; F04D 29/5806; F04D 13/06; F04D 25/0606; F04D 25/082; F04D 29/5813
See application file for complete search history.

(56) References Cited

U.S. PATENT DOCUMENTS

| | | | | |
|---|---|---|---|---|
| 3,644,067 | A | * | 2/1972 | Yowell .................... F04D 13/06 417/370 |
| 3,748,507 | A | * | 7/1973 | Sieber ...................... H02K 9/14 310/58 |

(Continued)

*Primary Examiner* — Peter J Bertheaud
(74) *Attorney, Agent, or Firm* — Schwegman Lundberg & Woessner, P.A.

(57) ABSTRACT

The present invention provides an electric water pump including a drive motor. The drive motor includes a cylinder-shaped motor housing, a stator, a rotor, a motor shaft, and an end cover. The motor housing is fixedly mounted on a side of the end cover. The side of the end cover is also fixedly provided with a cylinder-shaped casing, wherein the motor housing is positioned in the casing. A central axis line of the motor housing coincides with a central axis line of the casing. Another side of the end cover is provided with a pump body having a chamber. An end of the motor shaft away from the end cover is fixedly provided with a heat-dissipating fan, an end of the casing close to the end cover is provided with a first air inlet, and a rear end away from the casing is provided with a first air outlet.

6 Claims, 3 Drawing Sheets

(51) Int. Cl.
*H02K 5/18* (2006.01)
*F04D 25/08* (2006.01)
*F04D 29/62* (2006.01)
*F04D 29/42* (2006.01)
*H02K 9/06* (2006.01)
H02K 11/30 (2016.01)
H02K 5/16 (2006.01)
H02K 9/19 (2006.01)

(52) U.S. Cl.
CPC .............. *H02K 9/06* (2013.01); *H02K 9/19* (2013.01); *H02K 11/30* (2016.01)

(56) References Cited

U.S. PATENT DOCUMENTS

| | | | | |
|---|---|---|---|---|
| 4,742,257 A * | 5/1988 | Carpenter | ................ | H02K 9/14 |
| | | | | 310/57 |
| 4,992,687 A * | 2/1991 | Nel | ................ | H02K 11/048 |
| | | | | 219/133 |
| 5,156,535 A * | 10/1992 | Budris | ................ | F04D 13/06 |
| | | | | 417/423.7 |
| 5,982,071 A * | 11/1999 | Ehrick | ................ | H02K 1/30 |
| | | | | 310/216.054 |
| 7,923,875 B2 * | 4/2011 | Henry | ................ | H02K 5/225 |
| | | | | 310/64 |
| 8,350,423 B2 * | 1/2013 | Vadillo | ................ | H02K 9/14 |
| | | | | 310/58 |
| 9,048,700 B2 * | 6/2015 | Fleming | ................ | H02K 9/06 |
| 2013/0076172 A1 * | 3/2013 | Koyama | ................ | H02K 9/14 |
| | | | | 310/63 |

\* cited by examiner

ELECTRIC WATER PUMP

CROSS-REFERENCE TO RELATED APPLICATIONS

This Non-provisional application claims priority under 35 U.S.C. § 119(a) on Chinese Patent Application No(s). 201811229247.5 filed on Oct. 22, 2018, the entire contents of which are hereby incorporated by reference.

BACKGROUND OF THE INVENTION

Field of the Invention

The present disclosure relates to an electric water pump and, more particularly, to a heat dissipation structure of an electric water pump.

Description of the Related Art

With the improvement of people's living standard, there are an increasing number of outdoor leisure facilities such as swimming pools. Accordingly, there is a growing demand for electric water pumps, which serve as commonly-used ancillary facilities of the swimming pools. For existing electric water pumps, motor housings of drive motors also serve as casings of the electric water pumps, and thus the drive motors have defects such as poor heat dissipation effect and short service life, etc.

BRIEF SUMMARY OF THE INVENTION

To solve deficiencies of the prior art, the present disclosure provides an electric water pump having a high heat dissipation efficiency.

To achieve the above objective, the present disclosure adopts the following technical solutions.

An electric water pump includes a drive motor for driving the electric water pump. The drive motor includes a cylinder-shaped motor housing, a stator arranged on an inner wall of the motor housing, a rotor rotatably arranged in the stator, a motor shaft connected into the rotor and rotating with the rotor, and an end cover. The motor housing is fixedly mounted on a side of the end cover, the motor housing and the end cover are provided with a bearing for supporting the motor shaft, and the motor shaft rotates with respect to the bearing. A side of the end cover is fixedly provided with a cylinder-shaped casing, the motor housing is positioned in the casing, and a central axis line of the motor housing coincides with a central axis line of the casing. Another side of the end cover is provided with a pump body having a chamber, the pump body is internally provided with a rotating blade, and the rotating blade is connected to the motor shaft and is driven by the motor shaft to rotate. The pump body is provided with a water inlet and a water outlet communicating with the chamber. An end of the motor shaft away from the end cover is fixedly provided with a heat-dissipating fan, an end of the casing close to the end cover is provided with a first air inlet, and a rear end away from the casing is provided with a first air outlet. The first air inlet, a gap between the motor housing and the casing and the first air outlet form a first heat dissipation path.

Further, a range of a ratio of an outer diameter of the motor housing to an inner diameter of the casing may be greater than or equal to 0.75 and smaller than or equal to 0.95.

Further, a range of the gap between the motor housing and the casing may be greater than or equal to 5 mm.

Further, an outside surface of the casing may be provided with a control box. The control box may be internally provided with a controller electrically connected to the drive motor to control the drive motor to work. A plurality of heat dissipation fins may be formed on an outside surface of the control box, and the plurality of heat dissipation fins may be positioned between the control box and the drive motor and extend along an axial direction of the motor shaft. A location of the casing opposite to the heat dissipation fin may be provided with an plug window for inserting the heat dissipation fin. The first heat dissipation path may pass through the heat dissipation fin.

Further, a first face passing through a center of rotation of the motor shaft may be tangent to one of the heat dissipation fins, and the plurality of heat dissipation fins may be positioned on the same side of the first face. A second face passing through the center of rotation of the motor shaft may be tangent to another one of the heat dissipation fins, and the plurality of heat dissipation fins may be positioned on the same side of the second face. A range of an included angle formed by the first face and the second face intersecting with one another may be greater than or equal to 30° and smaller than or equal to 80°.

Further, the first face and the second face may divide space into four regions, and the first air inlet and the heat dissipation fin may be positioned within the same region.

Further, a distance from a center of rotation of the motor shaft to an end of each of the heat dissipation fins away from the controller may be equal.

Further, a second air inlet may be formed on a surface of the controller diverging from the casing, and a second air outlet may be formed between the plurality of heat dissipation fins. The second air inlet, an inner chamber of the controller, the second air outlet, the plug window, the gap between the motor housing and the casing, and the first air outlet may form a second heat dissipation path, and the second heat dissipation path may pass through the heat dissipation fins.

Further, the second air inlet may be positioned at an end of the controller close to the end cover.

Further, the casing may be also internally provided with a air guiding cover for guiding air flow, and the air guiding cover may be positioned between the fan and the drive motor.

Beneficial effects of the present disclosure are as below: the first heat dissipation path formed by the first air inlet, the gap between the motor housing and the casing and the first air outlet may provide a heat dissipation effect for the electric water pump.

The beneficial effects of the present disclosure also lie in that the heat dissipation efficiency of the controller is enhanced by embedding the heat dissipation fin on the controller into the first heat dissipation path.

Numerals: 10—electric water pump, 11—drive motor, 111—motor housing, 112—stator, 113—rotor, 114—motor shaft, 115—end cover, 12—casing, 13—pump body, 131— rotating impeller, 132—water inlet, 133—water outlet, 14—heat-dissipating fan, 121—first air inlet, 122—first air outlet, first heat dissipation path, 15—control box, 151—heat dissipation fin, 123—plug window, 16—first face, 17—second face, 124—air guiding cover, 18—pad, and 19—support frame.

DETAILED DESCRIPTION OF THE INVENTION

The present disclosure is introduced in detail below with reference to the accompanying drawings and embodiments.

Figure 1:
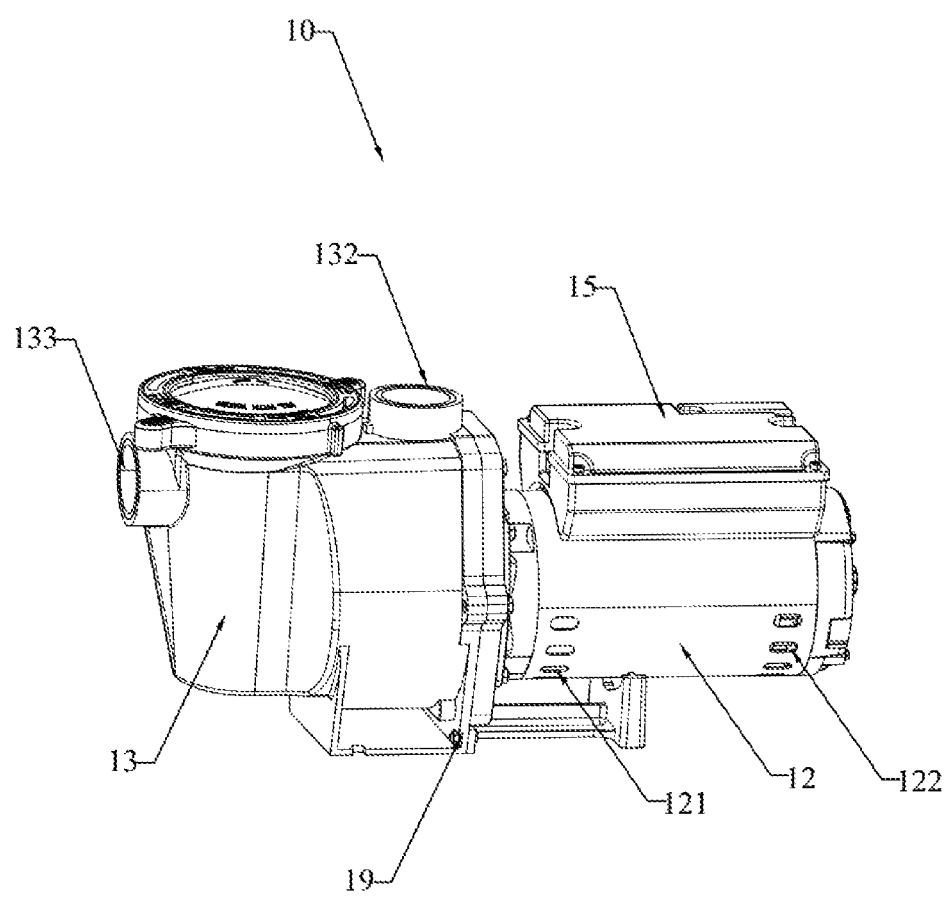
FIG. 1 is a schematic diagram of an electric water pump according to the present disclosure.
Figure 2:
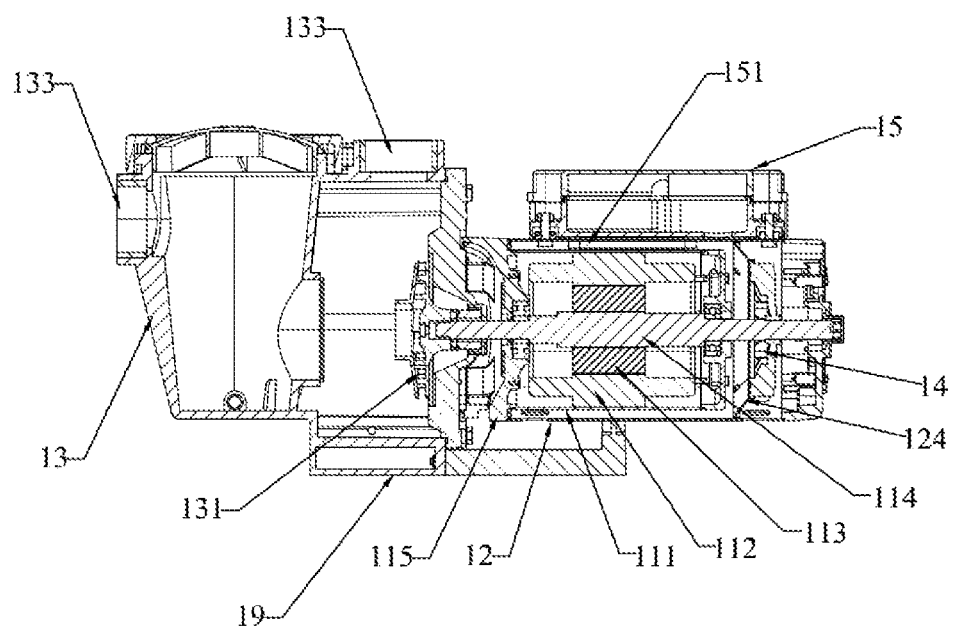
FIG. 2 is a cross-sectional view of the electric water pump in FIG. 1.
Figure 3:
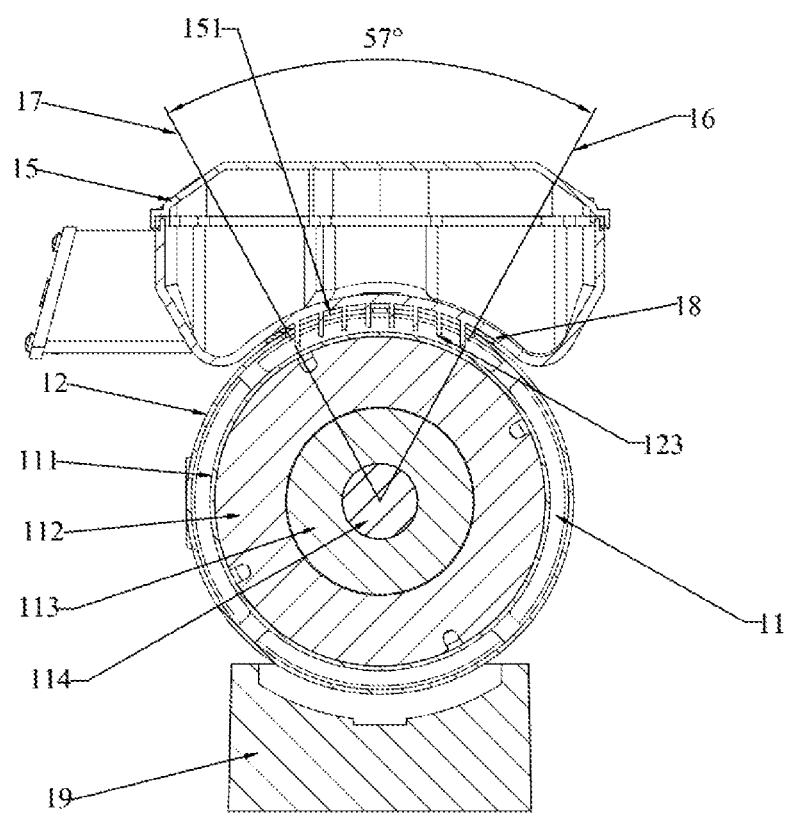
FIG. 3 is a cross-sectional view of the electric water pump in FIG. 1 from another viewing angle.

As shown in FIG. 1 to FIG. 3, an electric water pump 10 includes a drive motor 11 for driving the electric water pump 10. The drive motor 11 includes a motor housing 111, a stator 112, a rotor 113, a motor shaft 114, and an end cover 115.

Specifically, the motor housing 111 is cylinder-shaped, the stator 112 is arranged on an inner wall of the cylinder-shaped motor housing 111, the rotor 113 is rotatably arranged in the stator 112, and the motor shaft 114 is inserted into the rotor 113 and rotates with the rotor 113.

The motor housing 111 is fixedly mounted on a side of the end cover 115. The motor housing 111 and the end cover 115 are provided with a bearing for supporting the motor shaft 114. The motor shaft 114 is rotatably mounted on the bearing. A casing 12 wraps the motor housing 111 up, and the casing 12 is fixed to the end cover 115. A central axis line of the motor housing 111 coincides with a central axis line of the casing 12.

A pump body 13 having a chamber is mounted on another side of the end cover 115. The pump body 13 is internally provided with a rotating impeller 131, and the rotating impeller 131 is connected to the motor shaft 114 and is driven by the motor shaft 114 to rotate. The pump body 13 is provided with a water inlet 132 and a water outlet 133 communicating with the chamber, wherein the water inlet 132 and the water outlet 133 are respectively used for sucking water and discharging water. An end of the motor shaft 114 away from the end cover 115 is fixedly provided with a heat-dissipating fan 14, an end of the casing 12 close to the end cover 115 is provided with a first air inlet 121, and a rear end away from the casing 12 is provided with a first air outlet 122. The first air inlet 121, a gap between the motor housing 111 and the casing 12 and the first air outlet 122 form a first heat dissipation path. When the heat-dissipating fan 14 is driven to rotate, air flow enters the casing 12 through the first air inlet 121, then passes through the heat-dissipating fan 14 via the gap between the motor housing 111 and the casing 12, and finally is discharged from the casing 12 via the first air outlet 122. In this way, the air flow flows through the outer surface of the motor housing 111 to dissipate heat for the drive motor 11.

Specifically, the electric water pump 10 is also provided with a support frame 19 used for supporting the electric water pump 10.

As a preferred embodiment, a range of a ratio of an outer diameter of the motor housing 111 to an inner diameter of the casing 12 is greater than or equal to 0.75 and smaller than or equal to 0.95.

Specifically, parameter settings of the outer diameter of the motor housing 111 and the inner diameter of the casing 12 are related to air flow ventilation quantity of the first heat dissipation path and the overall dimension of the electric water pump 10. The ventilation quantity of the first heat dissipation path is ensured under the premise of guaranteeing the overall compact structure and smaller overall size, such that the electric water pump 10 is maintained at a higher heat dissipation level. Generally, the range of the ratio of the outer diameter of the motor housing 111 to the inner diameter of the casing 12 is greater than or equal to 0.75 and smaller than or equal to 0.95. In this embodiment, the outer diameter of the motor housing 111 is 72 mm, the inner diameter of the casing 12 is 80 mm, and thus the ratio of the outer diameter of the motor housing 111 to the inner diameter of the casing 12 is 0.9.

As a preferred embodiment, a range of the gap between the motor housing 111 and the casing 12 is greater than or equal to 5 mm. To ensure the ventilation quantity of the first heat dissipation path, the range of the gap between the motor housing 111 and the casing 12 is controlled to be greater than or equal to 5 mm. In this embodiment, the gap between the motor housing 111 and the casing 12 is 8 mm.

As a preferred embodiment, an outside surface of the casing 12 is provided with a control box 15. The control box 15 is internally provided with a controller (not shown) electrically connected to the drive motor 11 to control the drive motor 11 to work. A plurality of heat dissipation fins 151 are formed on an outside surface of the control box 15, and the plurality of heat dissipation fins 151 are positioned between the control box 15 and the drive motor 11 and extend along an axial direction of the motor shaft 114. A location of the casing 12 opposite to the heat dissipation fin 151 is provided with an plug window 123 for inserting the heat dissipation fin 151. The first heat dissipation path passes through the heat dissipation fin 151.

Specifically, the control box 15 is made of metal (generally aluminum). A plurality of heat dissipation fins 151 are integrally-molded on the control box 15, wherein the heat dissipation fins 151 extend along an axial direction of the motor shaft 114. The casing 12 is provided with an plug window 123. When the control box 15 is mounted on the casing 12, the heat dissipation fins 151 are inserted into the casing 12 and are positioned in the first heat dissipation path. When the heat-dissipating fan 14 is driven to rotate, air flow enters the casing 12 through the first air inlet 121, then passes through the heat-dissipating fan 14 via the gap between the motor housing 111 and the casing 12, and finally is discharged from the casing 12 via the first air outlet 122. In this way, the air flow flows through the heat dissipation fins 151 to dissipate heat for the control box 15. The control box 15 is fixedly mounted on the casing 12, and a pad 18 may be arranged between the control box 15 and the casing 12.

As a preferred embodiment, a first face 16 passing through a center of rotation of the motor shaft 114 is tangent to one of the heat dissipation fins 151, and the plurality of heat dissipation fins 151 are positioned on the same side of the first face 16. A second face 17 passing through the center of rotation of the motor shaft 114 is tangent to another one of the heat dissipation fins 151, and the plurality of heat dissipation fins 151 are positioned on the same side of the second face 17. A range of an included angle formed by the first face 16 and the second face 17 intersecting with one another is greater than or equal to 30° and smaller than or equal to 80°.

Specifically, the dimension of the heat dissipation fin 151 is restricted by many conditions. When the dimension of the heat dissipation fin 151 is too small, the heat dissipation fin 151 has a lower heat dissipation effect on the control box 15. If the dimension of the heat dissipation fin 151 is too large, this may have a negative effect on the overall structure design and component arrangement. Therefore, to ensure the heat dissipation efficiency of the control box 15 and the overall structure design, two planes passing through the center of rotation of the motor shaft 114 are employed to limit the dimension of the heat dissipation fin 151, wherein the first plane 16 is tangent to one heat dissipation fin 151 outside, and the second plane 17 is tangent to another heat dissipation fin 151 outside. All the heat dissipation fins 151 are positioned within a region restricted by the first plane 16 and the second plane 17. The range of the included angle between the first plane 16 and the second plane 17 is greater than or equal to 30° and smaller than or equal to 80°. In this embodiment, the included angle between the first plane 16 and the second plane 17 is 57°.

As a preferred embodiment, a range of a ratio of the included angle between the first face 16 and the second face 17 to the radius of the heat-dissipating fan 14 is greater than or equal to 0.8°/mm and smaller than or equal to 1.5°/mm.

Specifically, the heat-dissipating fan 14 needs to dissipate heat for the heat dissipation fin 151. The dimension of the heat-dissipating fan 14 depends on the size of the heat dissipation fin 151. When the heat dissipation fin 151 has a larger dimension, the heat-dissipating fan 14 having a larger dimension is required to dissipate heat for the heat dissipation fin 151. In this embodiment, the radius of the heat-dissipating fan 14 is 60 mm, and the ratio of the included angle between the first face 16 and the second face 17 to the radius of the heat-dissipating fan 14 is 0.95°/mm.

As an alternative embodiment, the first face 16 and the second face 17 divide space into four regions. The first air inlet 121 and the heat dissipation fin 151 are positioned within the same region.

Specifically, quantities of air flow are different at different locations of the first heat dissipation path. The first face 16 and the second face 17 divide space into four regions, and the first air inlet 121 and the heat dissipation fin 151 are positioned within the same region. Air flow entering the casing via the first air inlet 121 flows through the heat dissipation fin 151 in priority to enhance the heat dissipation effect of the heat dissipation fin 151 on the control box 15.

As a preferred embodiment, a distance from a center of rotation of the motor shaft 114 to an end of each of the heat dissipation fins 151 away from the control box 15 is equal.

Specifically, ends of all the heat dissipation fins 151 away from the control box 15 are positioned on a circle concentric with respect to the motor housing 111, such that the heat dissipation fins 151 may more closely mate with the motor housing 111.

As a preferred embodiment, a second air inlet is formed on a surface of the control box 15 diverging from the casing 12. A second air outlet is formed between the plurality of heat dissipation fins 151. The second air inlet, an inner chamber of the control box 15, the second air outlet, the plug window 123, the gap between the motor housing 111 and the casing 12, and the first air outlet 122 form a second heat dissipation path, and the second heat dissipation path passes through the heat dissipation fins 151.

Specifically, the second air inlet is formed on the surface of the control box 15 diverging from the casing 12. The second air outlet is formed between the plurality of heat dissipation fins 151. When the heat-dissipating fan 14 is driven to rotate, air flow enters the inner chamber of the control box 15 through the second air inlet, then enters the casing 12 via the second air outlet, then passes through the heat-dissipating fan 14 via the gap between the motor housing 111 and the casing 12, and finally is discharged from the casing 12 via the first air outlet 122.

As a preferred embodiment, the second air inlet 152 is positioned at an end of the control box 15 close to the end cover 115. Specifically, the second air inlet 152 is arranged away from the first air outlet 122, such that hot air flow discharged from the first air outlet 122 is prevented from directly entering the second air inlet 152, which may cause the hot air flow to circulate between the second air inlet 152 and the first air outlet 122.

As a preferred embodiment, the casing 12 is further internally provided with a air guiding cover 124 for guiding air flow, and the air guiding cover 124 is positioned between the fan and the drive motor 11. Specifically, the air guiding cover 124 guides the air flow to the heat-dissipating fan 14, thereby preventing the air flow from flowing at random and enhancing the heat dissipation efficiency.

The above shows and describes fundamental principles, major characteristics and advantages of the present disclosure. Those skilled in the art should understand that the above embodiments are not intended to limit the present disclosure in any form, and any technical solution obtained based on equivalent replacements or equivalent transformations fall within the scope of protection of the present disclosure.

What is claimed is:

1. An electric water pump, comprising:
a drive motor for driving the electric water pump, wherein the drive motor comprises a cylinder-shaped motor housing, a stator arranged on an inner wall of the motor housing, a rotor rotatably arranged in the stator, a motor shaft connected into the rotor and rotating with the rotor, and an end cover; the motor housing is fixedly mounted on a side of the end cover, the motor housing and the end cover are provided with a bearing for supporting the motor shaft, and the motor shaft rotates with respect to the bearing; a side of the end cover is fixedly provided with a cylinder-shaped casing, the motor housing is positioned in the casing, and a central axis line of the motor housing coincides with a central axis line of the casing; another side of the end cover is provided with a pump body having a chamber, the pump body is internally provided with a rotating blade, and the rotating blade is connected to the motor shaft and is driven by the motor shaft to rotate; the pump body is provided with a water inlet and a water outlet communicating with the chamber; an end of the motor shaft away from the end cover is fixedly provided with a heat-dissipating fan; an end of the casing close to the end cover is provided with a first air inlet; a rear end of the casing away from the end cover is provided with a first air outlet; and the first air inlet, a gap between the motor housing and the casing and the first air outlet form a first heat dissipation path;
wherein an outside surface of the casing is provided with a control box; the control box is internally provided with a controller electrically connected to the drive motor to control the drive motor to work; a plurality of heat dissipation fins are formed on an outside surface of the control box, and the plurality of heat dissipation fins are positioned between the control box and the drive motor and extend along an axial direction of the motor shaft; a location of the casing opposite to the plurality of heat dissipation fins is provided with a plug window for inserting the plurality of heat dissipation fins; and the first heat dissipation path passes through the plurality of heat dissipation fins;
wherein a second air inlet is formed on a surface of the control box diverging from the casing; a second air outlet is formed between the plurality of heat dissipation fins; and the second air inlet, an inner chamber of the control box, the second air outlet, the plug window, the gap between the motor housing and the casing, and the first air outlet form a second heat dissipation path, and the second heat dissipation path passes through the heat dissipation fins.

2. The electric water pump according to claim 1, wherein a range of a ratio of an outer diameter of the motor housing to an inner diameter of the casing is greater than or equal to 0.75 and smaller than or equal to 0.95.

3. The electric water pump according to claim 2, wherein a range of the gap between the motor housing and the casing is greater than or equal to 5 mm.

4. The electric water pump according to claim 1, wherein a distance from a center of rotation of the motor shaft to an end of each of the heat dissipation fins away from the controller is equal.

5. The electric water pump according to claim 1, wherein the second air inlet is positioned at an end of the controller control box close to the end cover.

6. The electric water pump according to claim 1, wherein the casing is further internally provided with an air guiding cover for guiding air flow, and the air guiding cover is positioned between the fan and the drive motor.

* * * * *